United States Patent
Fork et al.

(10) Patent No.: US 9,749,291 B2
(45) Date of Patent: Aug. 29, 2017

(54) SECURING APPLICATIONS ON PUBLIC FACING SYSTEMS

(75) Inventors: Michael J. Fork, Gibsonburg, OH (US); Christopher T. Gloe, Rochester, MN (US); Kevin G. Paterson, San Antonio, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1189 days.

(21) Appl. No.: 13/183,884

(22) Filed: Jul. 15, 2011

(65) Prior Publication Data

US 2013/0018765 A1 Jan. 17, 2013

(51) Int. Cl.
| H04L 29/12 | (2006.01) |
| H04L 29/06 | (2006.01) |
| H04L 29/08 | (2006.01) |
| G06F 9/455 | (2006.01) |

(52) U.S. Cl.
CPC ...... *H04L 61/2592* (2013.01); *G06F 9/45558* (2013.01); *H04L 61/2578* (2013.01); *H04L 63/0272* (2013.01); *H04L 67/10* (2013.01)

(58) Field of Classification Search
CPC . H04L 67/10; H04L 61/2007; H04L 63/0272; H04L 61/2592; H04L 61/2578; G06F 9/4445; G06F 9/45558
USPC .......................................................... 709/224
See application file for complete search history.

(56) References Cited

U.S. PATENT DOCUMENTS

| 7,444,415 | B1 | 10/2008 | Bazzinotti et al. |
| 7,505,421 | B2 | 3/2009 | Nagy et al. |
| 7,715,856 | B2* | 5/2010 | Shaheen ............. H04L 12/5895 455/453 |
| 2009/0328192 | A1 | 12/2009 | Yang et al. |
| 2010/0131636 | A1* | 5/2010 | Suri et al. ...................... 709/224 |
| 2011/0113467 | A1* | 5/2011 | Agarwal ............. G06F 21/6281 726/1 |
| 2012/0240110 | A1* | 9/2012 | Breitgand et al. ................ 718/1 |
| 2012/0240182 | A1* | 9/2012 | Narayanaswamy .. G06F 9/5077 726/1 |

* cited by examiner

*Primary Examiner* — Ryan Zeender
*Assistant Examiner* — Milena Racic
(74) *Attorney, Agent, or Firm* — Patterson + Sheridan, LLP

(57) ABSTRACT

Techniques are disclosed for configuring a virtual machine instance accessed over a publically routable network address to host intranet applications. A virtual (or "dummy") interface on the virtual machine instance is assigned an IP address that is inaccessible from the public interface. An application executed on the virtual machine instance is bound to a port on the network address assigned to this dummy interface. A virtual private network server assigns client's IP addresses that can be routed to the dummy interface. When a client computing system connects to the VPN server over the virtual machine instance's public interface, the client forwards traffic destined for the dummy interface's inaccessible network over the VPN connection.

25 Claims, 5 Drawing Sheets

SECURING APPLICATIONS ON PUBLIC FACING SYSTEMS

BACKGROUND

Embodiments presented herein relate to cloud-based computing environments. More specifically, embodiments presented herein relate to providing secure access to applications executing on virtual machines accessed over public facing networks.

Infrastructure as a service (IaaS) or cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand access to a shared pool of configurable computing resources that can be rapidly provisioned and released with minimal management effort or service provider interaction. Cloud computing may provide a user with a variety of virtual computing resources (e.g., computer, storage, and applications). Cloud providers may also allow clients to instantiate virtual machine instances, i.e., a virtualized computing server, within "the cloud," without regard for the underlying physical systems (or locations of those systems) used to provide the virtualized computing server.

Given the ease with which virtual machine instances can be created and scaled, cloud computing provides an enterprise with easy access to large amounts of computing power without requiring the investment in large numbers of physical server systems. Further, even where smaller amounts of resources are needed, cloud computing provides an approach that does not require an enterprise to purchase, configure, and maintain a physical computing infrastructure. As a result many enterprises have moved (or are interested in moving) applications to cloud based hosting services.

Virtual machine instances running on a publicly available infrastructure as a service (IaaS) offering or on a cloud based deployment are typically provisioned with a single, publicly accessible network interface and IP address. That is, the network address of the virtual machine instance is typically accessible by the public at large. At the same time, enterprises may have a suite of intranet based applications that lack user authentication or secure communication mechanisms that they want to move to a cloud based deployment. However such applications may have been developed to run inside an enterprise intranet, and exposing such applications over a publically routable IP address results in unacceptable security risks.

While such applications might be modified to support username/password (or other) authentication mechanisms, doing so requires modifying an existing code base, which in the case of a commercial application may not even be possible, and even where possible is susceptible to weak passwords and other vulnerabilities. In addition, if the existing application doesn't support encrypted communications, this would need to be added as well.

SUMMARY

Embodiments presented herein provide a method of configuring access to an application executed on a virtual machine (VM) instance hosted in a computing cloud. This method may generally include configuring a dummy interface on the VM instance. The dummy interface is assigned a network address that is inaccessible from the public interface. This method may also include binding the application executed on the VM instance to the dummy interface and establishing a VPN connection between a VPN server on the VM instance and a VPN client executing on a remote computing system. A VPN interface on the VPN client is assigned a network address that can be routed to the dummy interface, and an application executed on the VPN client forwards packets to the application executed on the VM instance over the VPN connection.

Another embodiment of the invention includes a computer program product storing a virtual machine (VM) instance, which when executed by a processor, performs an operation for providing access to an application executed on the VM instance. The operation may generally include configuring a dummy interface on the VM instance. The dummy interface is assigned a network address that is inaccessible from the public interface. The operation may further include binding the application executed on the VM instance to the dummy interface and establishing a VPN connection between a VPN server on the VM instance and a VPN client executing on a remote computing system. A VPN interface on the VPN client is assigned a network address that can be routed to the dummy interface, and an application executed on the VPN client forwards packets to the application executed on the VM instance over the VPN connection.

Still another embodiment includes a system having a processor and a memory storing a hypervisor configured to execute a virtual machine (VM) instance. The VM instance is configured to provide access to an application executed on the VM instance by performing an operation which includes configuring a dummy interface on the VM instance. The dummy interface is assigned a network address that is inaccessible from the public interface. This operation may further include binding the application executed on the VM instance to the dummy interface and establishing a VPN connection between a VPN server on the VM instance and a VPN client executing on a remote computing system. A VPN interface on the VPN client is assigned a network address that can be routed to the dummy interface, and an application executed on the VPN client forwards packets to the application executed on the VM instance over the VPN connection.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
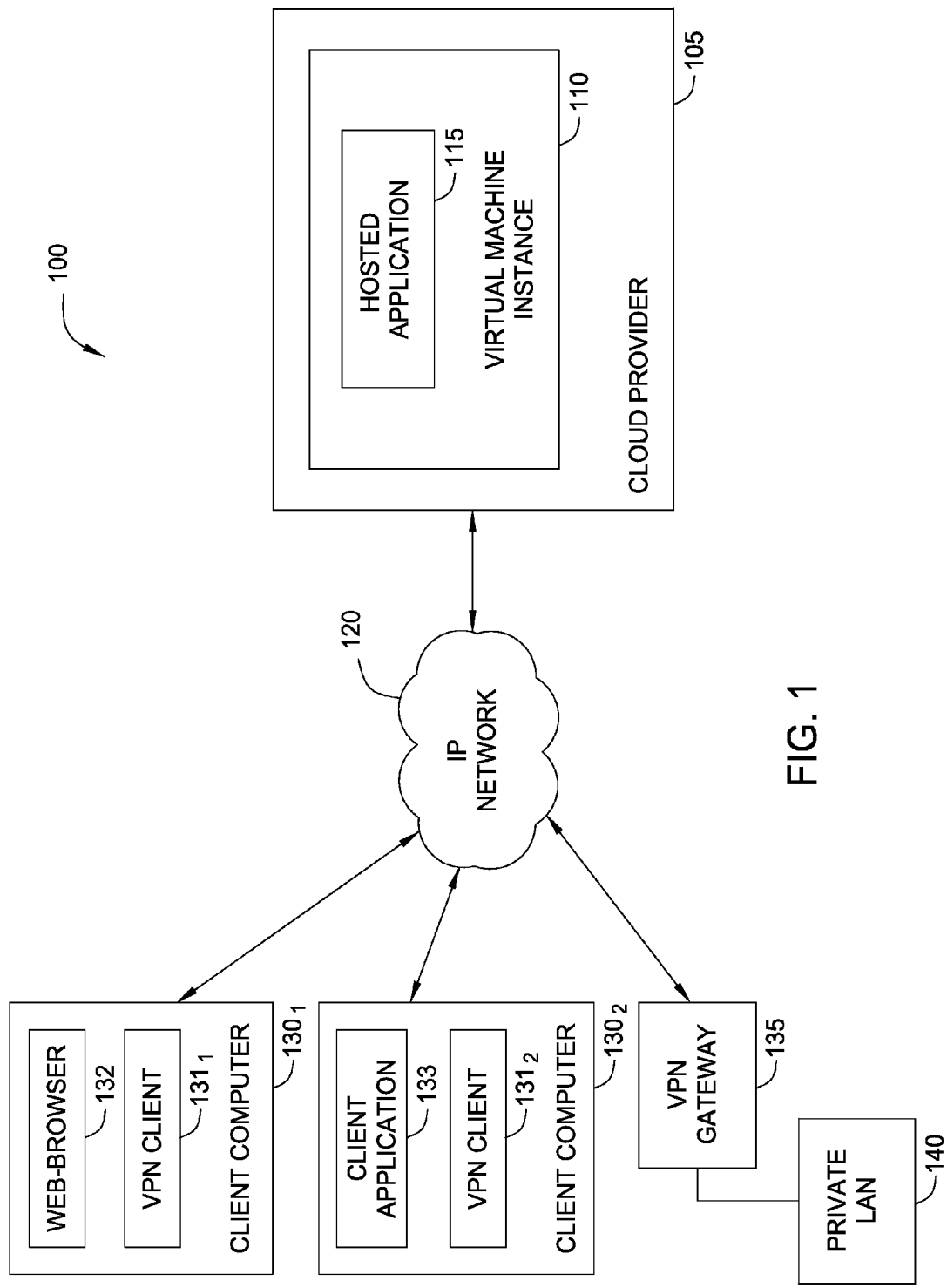
FIG. 1 illustrates an example computing infrastructure used to provide secure access to applications executing in a publically accessible computing cloud, according to one embodiment of the invention.

Embodiments of the invention provide techniques for securing compute resources within a computing cloud. More specifically, embodiments of the invention provide techniques for configuring a virtual machine instance accessed over a publically routable network address to host intranet applications which themselves do not support user authentication mechanisms or secure network communications. In other cases, an application may provide authentication and secure communication but the data is "sensitive" enough that an enterprise nevertheless desires to limit exposure or may be wary of application bugs that could expose data.

In one embodiment, a virtual network interface (referred to as a "dummy" interface) is assigned an internet protocol (IP) address on a network that is inaccessible from the public network and that does not conflict with the client networks requiring access. That is, the dummy interface creates an IP network interface for a network that exists only on the virtual machine instance. Such an address may conform to the internet protocol network layer protocol, but other network layer protocols could be used. An application executed on the virtual machine instance binds to a port on a network address assigned to this dummy interface. A virtual private network (VPN) server listens on the publicly accessible network interface of the virtual machine instance. That is, the VPN server listens for traffic addressed to the publically routable IP address of the virtual machine instance. The VPN server assigns clients IP addresses from a network block used by the dummy interface. When a client computing system connects to the VPN server over the virtual machine instance's public interface, the client forwards network traffic destined for the dummy interface's inaccessible network over the VPN connection. In turn, the VPN server passes traffic received from the client destined for the "dummy" interface, and in turn, to the application.

This approach allows secure access to applications bound to the dummy interface without requiring any modifications to such applications. Further, by configuring the VPN server to enforce an appropriate security policy, this approach does have to be susceptible to weak passwords or other common vulnerabilities. Thus embodiments of the invention allow an enterprise to migrate intranet (and other) applications to publicly available hosting infrastructure (i.e., to virtual machine instances in "the cloud"), even though such applications were developed for deployment on a private intranet.

Further, this approach of routing VPN traffic to the dummy interface (over the use of a private VLAN for example) can help build a "trust" case for the cloud provider. For example, if an enterprise customer knows that it is not possible for any of the intranet application traffic from the dummy interface to flow anywhere other than out to the clients through the VPN server (as the network only exists otherwise on the virtual machine instance), it may be easier for the provider to convince enterprise customers of the desirability of a cloud deployment for intranet applications. In another case, a service provider may offer an application as a service, where the application can be considered secure from the public at large and still be able to be managed by the service provider without accessing a customer's private network.

FIG. 1 illustrates an example computing infrastructure 100 used to provide secure access to applications executing in a publically accessible computing cloud, according to one embodiment of the invention. As shown, the computing infrastructure 100 includes a cloud provider 105, a client computing system $130_{1-2}$, and a VPN gateway 135, all connected to a common IP network 120 (such as the Internet).

Illustratively, the cloud provider 105 hosts a virtual machine instance 110, which itself is executing a hosted application 115. The virtual machine instance 110 (VMI) provides a software implementation of computing system that executes applications (e.g., hosted application 115) like a physical machine. That is, virtual machine instance 110 provides a complete computing platform which supports the execution of an operating system (OS), which in turn executes user level applications as though they were running on a physical computing system. Enterprises can create virtual machine instances using the service offered by cloud provider 105 without having to invest in and maintain physical computing resources.

In this example, hosted application 115 corresponds to a software application generally designed to execute inside a corporate intranet or local network—that is to an application not designed to be exposed over a publically accessible networks. Client computer $130_{1-2}$ may each include a VPN client $131_{1-2}$ used to create virtual network interface on the client computer that routes traffic to/from a VPN server, e.g., a VPN server on the virtual machine instance 110. Further, in this example, client computer $130_1$ includes a web-browser 132 used to communicate with the virtual machine instance 110 (and hosted application 115) over the network 120. For example, the hosted application could include a web server, application server, and a database. In such a case, the hosted application 115 is accessed using HTTP URLs, to access, retrieve, and ultimately render an interface to the hosted application 115 on the web browser 132. Similarly, client computer $130_2$ includes a client application 133 used to communicate with the virtual machine instance 110 (and hosted application 115) over the network 120. In such a case, the hosted application 115 could be a server or daemon configured to process requests by a client application 133 specifically developed to access services provided by the hosted application 115.

In either case, however, the hosted application 115 may not provide the appropriate security mechanisms needed to protect the application 115 (or associated data) from unwanted, unauthorized, or malicious access. For example, an intranet application may not require users to authenticate themselves with a username and password or might not encrypt traffic exchanged between itself and a client (e.g., between itself and web browser 132 or client application 133). To address this issue, in one embodiment, the hosted application 115 is bound to a dummy interface configured on the virtual machine instance 110. The dummy interface provides a network address and corresponding TCP/IP stack that is not accessible outside of the virtual machine instance. Further a VPN server running on the virtual machine instance is used to direct traffic to/from hosted application 115 via the dummy interface. Because the VPN server (and associated VPN clients) may provide a strong security framework, the hosted application 115 can be safely migrated to the cloud provider 105 without needing to be refactored to add authentication and security mechanisms.

Further, in one embodiment, a VPN gateway 135 may be used to route traffic to the VPN server on the virtual machine instance 110. In such a case, rather than each client establishing a VPN connection to the VPN server individually, hosts on a private LAN 140 send traffic to the hosted application 115 by way of the VPN gateway 135 using routing table entries on the VPN gateway 135.

Figure 2:
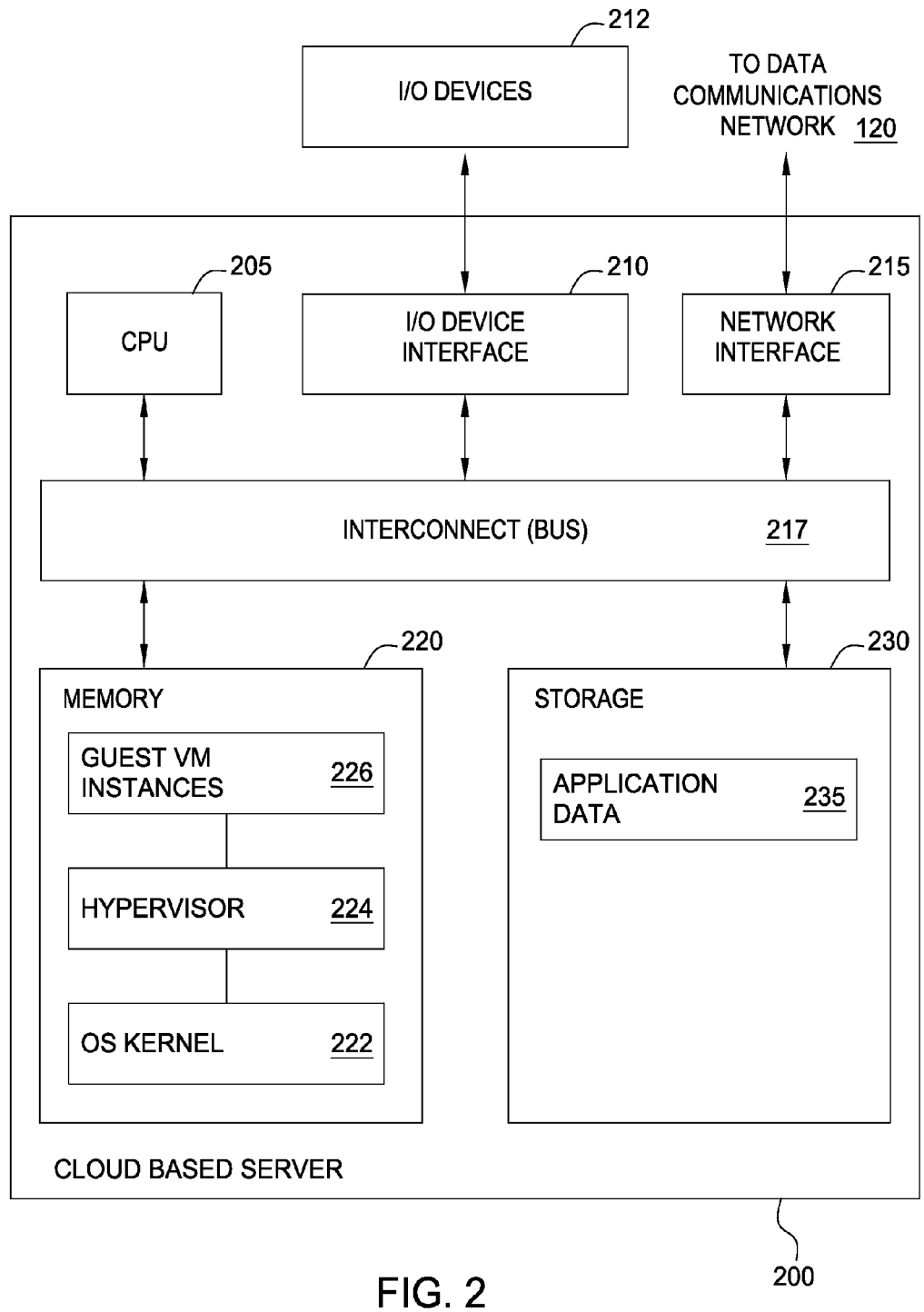
FIG. 2 illustrates an example of a computing server configured to provide cloud-based computing resources, according to one embodiment of the invention.

FIG. 2 illustrates an example of a computing server 200 configured to provide cloud-based computing resources, according to one embodiment of the invention. Computing server 200 generally corresponds to a physical computing system managed, e.g., by the cloud provider 105 shown in FIG. 1. Accordingly, computing server 200 could be one of many systems present in a data center managed by the cloud provider 105. As shown, the computing server 200 includes, without limitation, a central processing unit (CPU) 205, a network interface 215, an interconnect 217, a memory 220 and storage 230. The computing server 200 may also include an I/O device interface 210 connecting I/O devices 212 (e.g., keyboard, display and mouse devices) to the computing server 200.

The CPU 205 retrieves and executes programming instructions stored in the memory 220. Similarly, the CPU 205 stores and retrieves application data residing in the memory 220. The interconnect 217 facilitates transmission, such as of programming instructions and application data, between the CPU 205, I/O device interface 210, storage 230, network interface 215, and memory 220. CPU 205 is included to be representative of a single CPU, multiple CPUs, a single CPU having multiple processing cores, and the like. The memory 220 is generally included to be representative of a random access memory. The storage 230 may be a disk drive storage device. Although shown as a single unit, the storage 230 may be a combination of fixed and/or removable storage devices, such as fixed disc drives, floppy disc drives, tape drives, removable memory cards or optical storage, network attached storage (NAS), or a storage area-network (SAN). Application data 235 generally corresponds to any information written to disk by the hypervisor 224 (for itself or on behalf of a guest VM instance), OS kernel 222, or other applications executed on the computing server 200.

As shown, the memory 220 includes operating system (O/S) kernel 222, a hypervisor 224 and guest virtual machine instance 226, and storage 230 includes application data 235. OS kernel 222 provides the core operating system components and drivers used to control the physical hardware components of the computing server 200. Hypervisor 224, also called virtual machine manager (VMM), provides a software application that allows multiple operating virtual machine instances, e.g., VM instance 226, to run concurrently on computing server 200. As is known, the hypervisor 224 presents each guest VM instance 226 with a virtual operating platform and manages the execution of the guest operating systems on the virtualized systems. In context of the present invention, one (or more) of the guest VM instances 226 may be configured to execute an intranet application bound to a dummy interface on the VM instance, i.e., to a virtualized network interface on the virtualized hardware of the guest VM instance 226. In turn, the hypervisor 224 executes multiple VM instances 226 transparently to one another.

Figure 3:
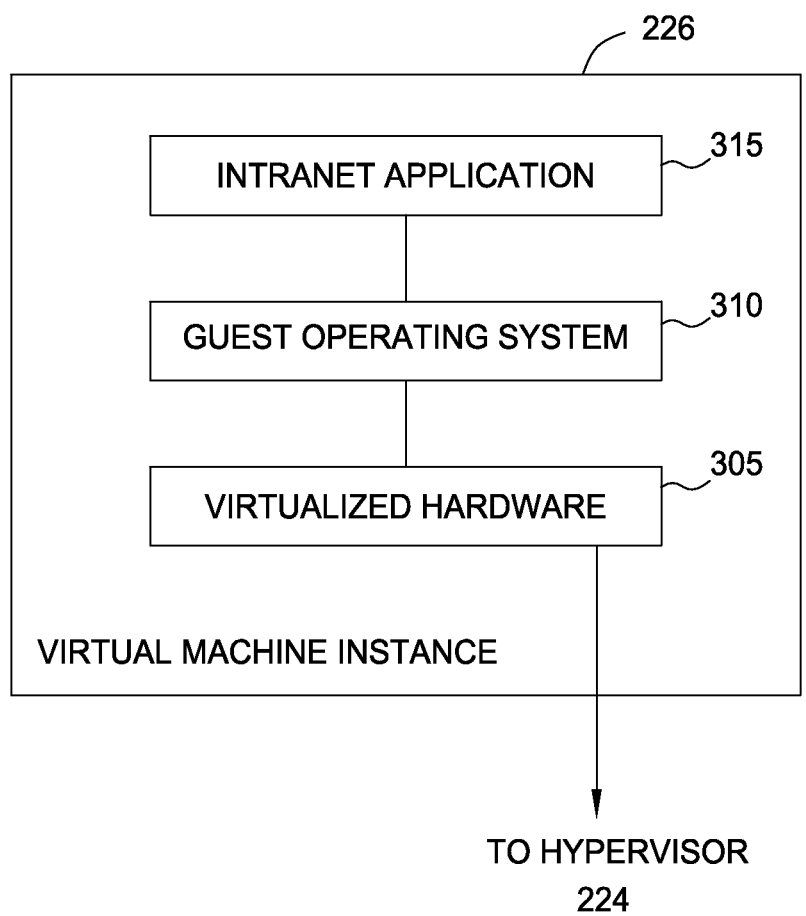
FIG. 3 illustrates an example of a virtual machine instance, according to one embodiment of the invention.

FIG. 3 further illustrates an example of a VM instance 226, according to one embodiment of the invention. As shown, the VM instance 226 includes virtualized hardware 305, guest operating system 310 and an intranet application 315. Virtualized hardware 305 corresponds to the virtualized physical computing provided by the hypervisor to the guest operating system 310. For example, the virtualized resources may include a virtualized CPU clocked to a specified frequency or having a specified number of processing cores. Similarly, virtualized hardware 305 may also include a virtualized memory storage, providing a range of memory addresses read from and written to by the guest operating system 310 and intranet application 315 in the same manner as physical memory modules. Virtualized hardware 305 may also include one (or more) virtual network interfaces as well as storage volumes mounted by the operating system 310.

Collectively, the virtualized hardware 305 provides a collection of computing resources managed by a guest operating system 310 in the same manner as a comparable set of physical computing hardware. That is, the guest operating system 310, e.g., a distribution of the Linux® operating system, is installed, booted and executed on the virtual hardware in the same manner as a physical server. Note, Linux is a trademark of Linus Torvalds in the U.S. and in other countries. System calls invoked by the guest operating system 310 are intercepted by the hypervisor, which performs the requested operation and provides the appropriate response back to the guest operating system 310. For example, the guest operating system may invoke I/O operations to read data from a specified memory address on behalf of an application. Such a call is intercepted by the hypervisor, which performs the requested memory read, and returns data to the operating system. Intranet application 315 provides a software application executed by the guest operating system. As noted, intranet application 315 may be designed to execute inside a corporate intranet or local network—that is, intranet application 315 is not designed to be exposed over publically accessible networks.

In one embodiment, a dummy interface is configured on the guest operating system 310. The dummy interface provides a virtual network interface on the VM instance 226. This dummy interface is assigned an IP address and can have packets routed to/from the interface like any other. In one embodiment, the IP address may be assigned from one of the reserved IP addresses such as the 10.0.0.0/8 block or the 192.168.0.0/16 block. Any network packets sent to/from the dummy interface are effectively routed back to the same VM machine instance 226. Further, the intranet application 315 is bound to the IP address (and a port) associated with the dummy interface on the VM instance 226. This results in the intranet application being accessible only over a virtual network on VM machine instance 226. For example, assume the intranet application 315 is a database server listening on port 3306. Binding the database server using this port to the dummy interface makes the database server accessible only from applications on the virtual machine instance 226. For example, a query application running on the VM instance 226 could send database queries to the server, while applications on other systems could not.

In such a case, to allow outside applications to access the database server, a VPN server is configured to allow clients to connect to the VM instance 226 and provide network addresses to such clients using the addresses from the same block as the dummy interface (e.g., one of the 10.0.0.0/8 block or the 192.168.0.0/16 blocks). The VPN server, therefore, limits network access to users already authorized for the company network on behalf of the intranet application 315.

Figure 4:
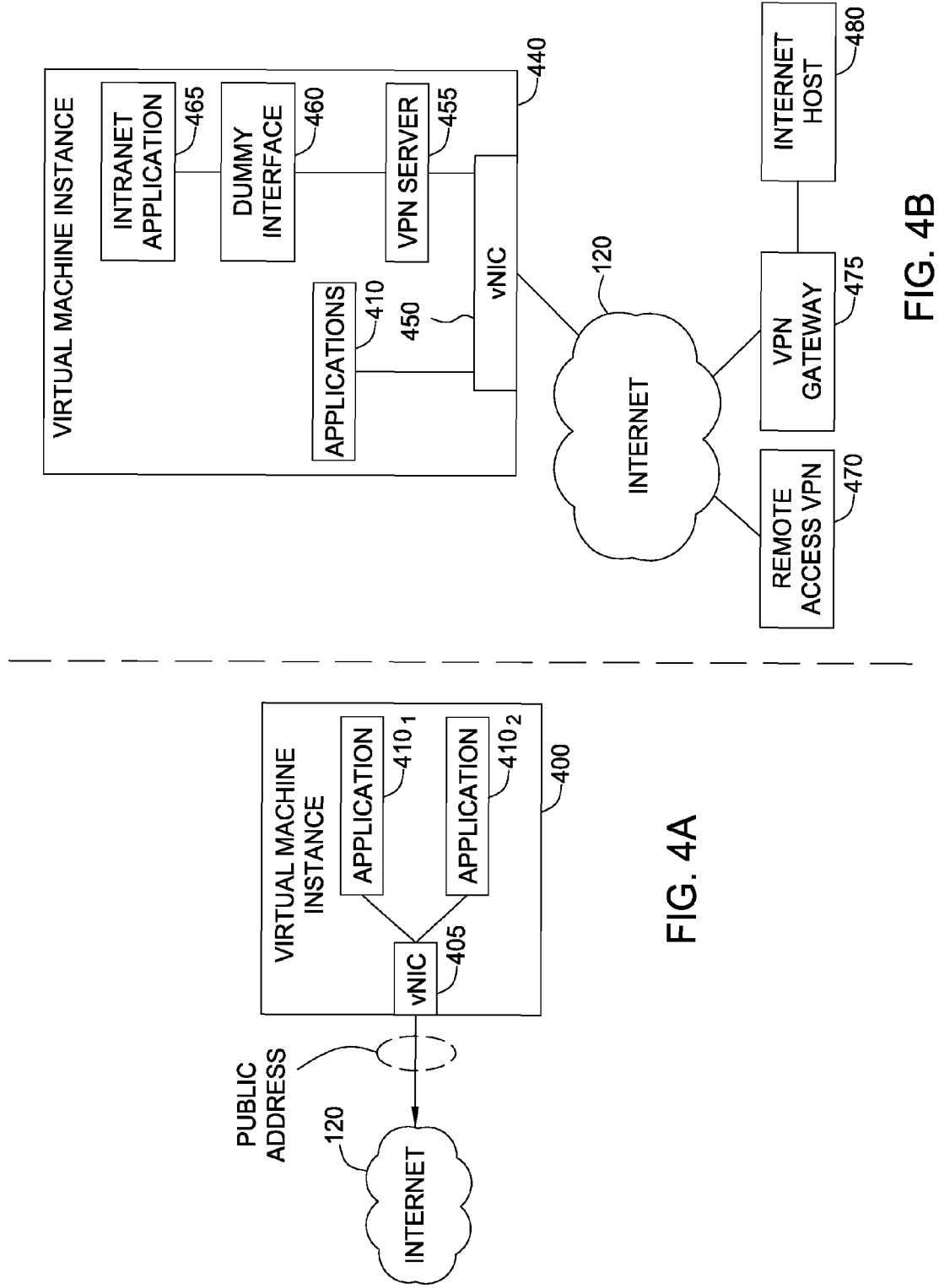
FIGS. 4A-4B are functional block diagrams of a virtual machine instance configured to provide secure access to applications, according to one embodiment of the invention.

This approach is shown in FIGS. 4A-4B, which provides functional block diagrams of virtual machine instances configured to provide secure access to intranet applications, according to one embodiment of the invention. First, FIG.

4A shows a virtual machine instance 400 with a virtual network interface 405. As noted, the virtual machine instance 400 may be executed on physical computing system managed by computing cloud provider. Further, the cloud provider may provision the virtual machine instance with a publically routable IP address, allowing access to the virtual machine instance 400 within the computing cloud. As shown, virtual machine instance 400 includes a virtual network interface vNIC 405 (an element of the virtualized computing hardware). A user may access the virtual machine instance 405 using a variety of shells, terminals, remote desktop applications in order to install software, manage existing software, etc., or more generally, simply access the computing resources of the VM instance.

As shown in FIG. 4A, applications $410_1$ and $410_2$ are accessible over the public IP address assigned to vNIC 405. In many cases, this is desirable, e.g., assume applications $410_{1-2}$ provide a web and application server used to provide an enterprises' public web site. In other cases, however, the enterprise may have applications that are not intended to be generally accessible. As noted, such intranet applications have conventionally been deployed within an enterprise's internal networks and frequently do not include the appropriate security features needed for a public-facing application.

FIG. 4B illustrates an example virtual machine instance 440 deployed on a publically accessible computing cloud. As shown in FIG. 4B, virtual machine instance 440 has been configured to provide secure access to such an intranet application 465, according to one embodiment of the invention Like virtual machine instance 400 of FIG. 4A, virtual machine instance 440 of FIG. 4B includes a vNIC 450 used to connect the virtual machine instance 440 to an IP network 120 such as the Internet. Doing so allows users to access application 410 as well as access the virtual machine instance 440 (e.g., using a remote desktop application).

Additionally, virtual machine instance 440 includes an intranet application 465. In this example, the intranet application 465 is bound to a dummy interface 460 on the virtual machine instance 440. To access the intranet application 465, a remote access VPN client 470 establishes a connection with the VPN server 455. Doing so may involve a user providing authentication credentials (e.g., a username and password or other digital credentials). The VPN server 455 assigns an address to VPN client 470 using the same network address block as an IP address assigned to the dummy interface 460. A client application can send network packets addressed to the intranet application 465. The VPN client 470 encrypts the packets and encapsulates the resulting encrypted payload with an outer IP header. The resulting packets are routed over network 120 to the vNIC (and public IP Address of the virtual machine instance 440), which forwards them to the VPN server 455. The VPN server 455 decrypts, decapsulates, and forwards the inner packet to the dummy interface 460, which in turn forwards the inner packet to the intranet application 465.

Network packets sent by the intranet application 465 to a client application traverse the same path in reverse. Such packets meet criteria for the VPN connection and so are encapsulated and encrypted by the VPN server 460 and forwarded to the public IP of the client computing system. Once received, the VPN client 470 decrypts and decapsulates the packets before forwarding them back to the client application. As noted, in addition to establishing a connection with individual remote access VPN clients 470, a collection of hosts may forward traffic to a VPN gateway 475, where the VPN gateway has established a connection to the VPN server 455 (and intranet application 460). VPN gateway 475 may be connected to an Internet host 480.

Figure 5:
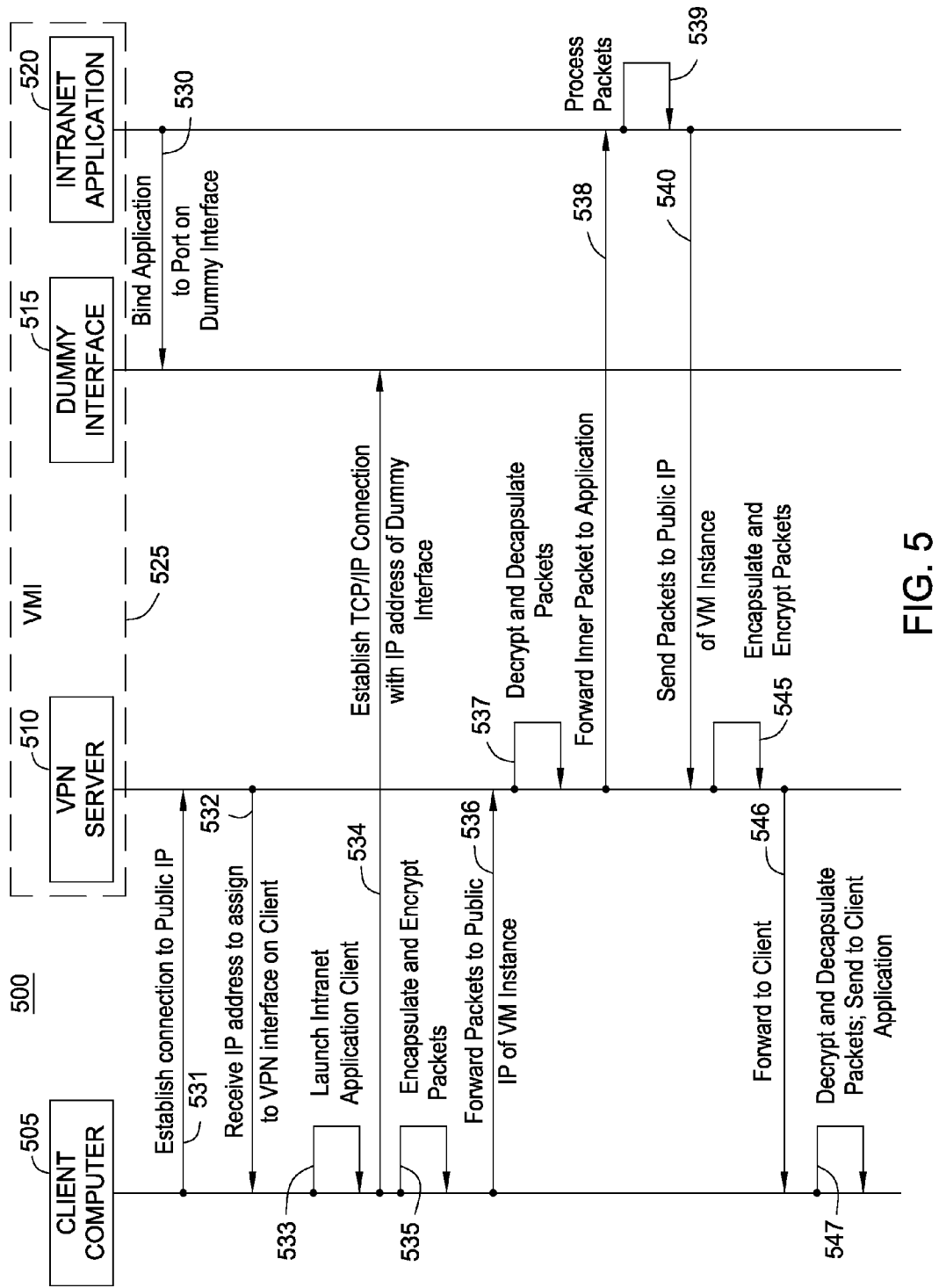
FIG. 5 is a timing sequence diagram illustrating a method for providing access to an application hosted on a virtual machine instance executing in a publically accessible computing cloud, according to one embodiment of the invention.

FIG. 5 is a timing sequence diagram illustrating a method 500 for providing access to an intranet application 520 hosted on a virtual machine instance 525 executing in a publically accessible computing cloud, according to one embodiment of the invention. More specifically, FIG. 5 illustrates a set of interactions for applications on client computing system 505 to access an intranet application 520 executing on a virtual machine instance 525. As shown, at 530, the intranet application 520 is bound to a dummy interface 515 on the virtual machine instance 525. For example, a user may configure the intranet application 520 to listen for network traffic addressed to an IP address assigned to the dummy interface that is sent to a specific port. Doing so allows the intranet application 520 to be accessed by applications on the virtual machine instance 525.

At 531, the client 505 establishes a connection to the public IP of the VM instance 525. For example, a VPN client on the client computer 505 may connect to the VPN server 510. Doing so may require a user to provide the appropriate credentials to the VPN server 510 in order to be allowed to join the VPN. At 532, provided the user is successfully authenticated, the VPN server 510 assigns an IP address to use on a VPN interface on the client computer 505. In one embodiment, the address assigned to the VPN interface on the client 505 is selected from the same block as the dummy interface 515 (e.g., one of the 10.0.0.0/8 block or the 192.168.0.0/16 blocks). At 533, a user launches the intranet application 520, e.g., by launching a web link or a rich client configured to connect to the IP address assigned to the dummy interface 515. And at 534, a TCP/IP connection is established between the client VPN's assigned IP and the dummy interface's IP.

Once established, the packet flow for this TCP connection and subsequent application packet flows is as follows. At 535, network traffic sent by the web browser or rich client to the dummy interface IP address meets the criteria for the VPN connection and, as a result, is encapsulated and encrypted by the VPN client. At 536, the resulting encrypted packets are forwarded to the public IP on the virtual machine instance 525 (i.e., to the VPN server 510). Once received, the packets are decrypted and decapsulated (at 537), leaving the inner packet which is destined for the IP address of the dummy interface 515 and the port for the intranet application 520. At 538, this packet is forwarded up the TCP/IP stack of the dummy interface 515, where it is received and processed by the intranet application 520 (at 539).

In the other direction, at 540, application packets are sent by the intranet application 520 to the VPN server 510 using the bound dummy interface's IP address. Such packets meet the criteria of the VPN connection, and so are encapsulated and encrypted by the VPN server 510 (at 545) and forwarded to the public IP address of the client application (at 546). Once received over the public IP address of the client computer 505, the VPN packets are forwarded to the VPN client interface, where they are decrypted and decapsulated (at 547), leaving the inner packet as originally sent by the intranet application 520 towards the dummy interface 515. The inbound application packet may then be forwarded up the TCP/IP stack on the client, where it is received and processed by the web browser or rich client executing on client computer 505.

As noted, in an alternative embodiment, a VPN gateway establishes a VPN connection to VPN server accessed using the public IP address of the virtual machine instance. In such a case, the VPN connection is configured to tunnel packets between a subnet on which the client computer resides and the subnet of the dummy interface. And routing is configured within the client's network such that packets destined for the dummy interface are routed through the VPN gateway, where they are encapsulated and encrypted (in one direction) and decrypted and decapsulated (in the other direction) as packets are sent to and from the virtual machine instance. Such a VPN connection can be persistent or be configured to be established on demand, e.g., when a client launches the intranet application using a web link or a rich client.

In this embodiment, a TCP connection is established between the IP of the client application and the IP address on the dummy interface. Further, in such a case, the IP address assigned to the dummy interface on the virtual machine instance can be specified by the customer so that the customer can ensure there are no conflicts with an existing on-premise (client side) network. The packet flow for this TCP connection (and subsequent application packet flows) is as follows. Outbound packets from the client application are routed to the client VPN gateway based on routing tables within the client's network. Packets received on the client's VPN gateway matching the VPN criteria are, encrypted, encapsulated, and forwarded to the public IP address on the virtual machine instance.

Inbound VPN packets received by the public IP address on the virtual machine instance are processed as described above for packets sent by a single VPN client. Similarly, outbound application packets sent from the server (using the bound dummy interfaces IP address) meet the criteria for the VPN connection and so are encapsulated and encrypted by the VPN server and forwarded to the VPN gateway in the client's network.

VPN packets sent from the virtual machine instance are then received over the public IP on the VPN gateway in the client's network, where they are decrypted and decapsulated, leaving the inner packet destined for the IP interface for the client application. Such packets are then routed to the client application.

Advantageously, embodiments described herein allow secure access to applications running on a virtual machine instance in "the cloud." In one embodiment, a dummy interface is assigned an IP address on a network inaccessible from the public interface. An application executed on the virtual machine instance is bound to a port on the IP address assigned to this dummy interface. A VPN server listens for traffic addressed to the publically routable IP address of the virtual machine instance. The VPN server assigns clients IP addresses that are routable to the dummy interface. When a client computing system connects to the VPN server over the virtual machine instance's public interface, the client forwards network traffic destined for the dummy interface's inaccessible network over the VPN connection. In turn, the VPN server forwards traffic received from the client to the "dummy" interface, and in turn, to the application. In an alternative embodiment, a VPN gateway 135 may be used to route traffic for an entire subnet to the VPN server on the virtual machine instance 110.

Embodiments of the present invention may also be delivered as part of a service engagement with a client corporation, nonprofit organization, government entity, internal organizational structure or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems, For example, in context of the described embodiments, a cloud provider may invoice a user consuming cloud based computing resources such as a virtual machine instance configured with a dummy interface and VPN server.

In this application, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method of providing secured access to an intranet application via an external network, the computer-implemented method comprising:
    configuring a dummy interface on a virtual machine (VM) instance being hosted in a computing cloud and including virtualized hardware, the VM instance having an external interface accessible via the external network, wherein the intranet application executes on the VM instance, wherein the dummy interface is assigned a network address that is inaccessible from the external interface, wherein the dummy interface provides an interface for a virtual network that exists only on the VM instance;
    binding the intranet application to the dummy interface and by operation of one or more computer processors; and
    establishing, over the external network, a virtual private network (VPN) connection between a VPN server on the VM instance and a VPN client executing on a remote computing system, wherein a VPN interface on the VPN client is assigned a network address that is routable to the dummy interface, whereafter a client application, executing on the VPN client, forwards packets to the intranet application bound to the dummy interface over the VPN connection.

2. The computer-implemented method of claim 1, wherein the VPN server is accessed using a public network address assigned to a virtual network interface on the VM instance.

3. The computer-implemented method of claim 2, wherein the VPN connection encrypts network packets forwarded over a public network address of the remote computing system to the public network address of the VM instance.

4. The computer-implemented method of claim 1, wherein the VPN server is configured to authenticate a request to establish the VPN connection.

5. The computer-implemented method of claim 1, wherein the remote computing system is a VPN gateway.

6. The computer-implemented method of claim 5, wherein the VPN gateway is part of a private network subnet, wherein network packets addressed to the dummy interface on the VM instance are routed to the VPN gateway.

7. The computer-implemented method of claim 1, further comprising:
    metering use of the VM instance associated with a request; and
    generating an invoice based on the metered use.

8. A system to provide secured access to an intranet application via an external network, the system comprising:
one or more computer processors; and
a memory storing a hypervisor configured to execute a virtual machine (VM) instance by operation of the one or more computer processors to perform an operation, the VM instance being hosted in a computing cloud and including virtualized hardware, the operation comprising:
configuring a dummy interface on the VM instance, the VM instance having an external interface accessible via the external network, wherein the intranet application executes on the VM instance, wherein the dummy interface is assigned a network address that is inaccessible from the external interface, wherein the dummy interface creates an interface for a virtual network that exists only on the VM instance,
binding the intranet application to the dummy interface, and
establishing, over the external network, a virtual private network (VPN) connection between a VPN server on the VM instance and a VPN client executing on a remote computing system, wherein a VPN interface on the VPN client is assigned a network address that is routable to the dummy interface, whereafter a client application, executing on the VPN client, forwards packets to the intranet application bound to the dummy interface over the VPN connection.

9. A non-transitory computer-readable medium containing a program executable to perform an operation for providing secured access to an intranet application via an external network, the operation comprising:
configuring a dummy interface on a virtual machine (VM) instance being hosted in a computing cloud and including virtualized hardware, the VM instance having an external interface accessible via the external network, wherein the intranet application executes on the VM instance, wherein the dummy interface is assigned a network address that is inaccessible from the external interface, wherein the dummy interface provides an interface for a virtual network that exists only on the VM instance;
binding the intranet application to the dummy interface and by operation of one or more computer processors; and
establishing, over the external network, a virtual private network (VPN) connection between a VPN server on the VM instance and a VPN client executing on a remote computing system, wherein a VPN interface on the VPN client is assigned a network address that is routable to the dummy interface, whereafter a client application, executing on the VPN client, forwards packets to the intranet application bound to the dummy interface over the VPN connection.

10. The non-transitory computer-readable medium of claim 9, wherein the VPN server is accessed using a public network address assigned to a virtual network interface on the VM instance.

11. The non-transitory computer-readable medium of claim 9, wherein the VPN connection encrypts network packets forwarded over a public network address of the remote computing system to the public network address of the VM instance.

12. The non-transitory computer-readable medium of claim 9, wherein the VPN server is configured to authenticate a request to establish the VPN connection.

13. The non-transitory computer-readable medium of claim 9, wherein the remote computing system is a VPN gateway.

14. The non-transitory computer-readable medium of claim 13, wherein the VPN gateway is part of a private network subnet, wherein network packets addressed to the dummy interface on the VM instance are routed to the VPN gateway.

15. The system of claim 8, wherein the system is of providing secured access to the intranet application via the external network and without requiring modification to the intranet application, wherein the network address assigned to the dummy interface is inaccessible from the external network, wherein the dummy interface comprises a virtual network interface.

16. The system of claim 8, wherein the VPN server is accessed using a public network address assigned to a virtual network interface on the VM instance.

17. The system of claim 16, wherein the VPN connection encrypts network packets forwarded over a public network address of the remote computing system to the public network address of the VM instance.

18. The system of claim 8, wherein the VPN server is configured to authenticate a request to establish the VPN connection.

19. The system of claim 8, wherein the remote computing system is a VPN gateway.

20. The system of claim 19, wherein the VPN gateway is part of a private network subnet, wherein network packets addressed to the dummy interface on the VM instance are routed to the VPN gateway.

21. The system of claim 8, the intranet application and the client application are distinct applications, wherein the intranet application was designed to be accessed from the intranet, wherein the intranet application was not designed to be accessed over the external network, wherein the operation further comprises:
enforcing a predefined security policy, by at least one of the VPN server and the VPN client, in order to provide secured access to the intranet application via the external network and without requiring modification to the intranet application.

22. The system of claim 21, wherein the VPN server is accessed using a first public network address assigned to a virtual network interface on the VM instance;
wherein the VPN connection encrypts network packets forwarded over a second public network address of the remote computing system to the first public network address of the VM instance.

23. The system of claim 22, wherein the VPN server is configured to authenticate a request to establish the VPN connection, wherein the intranet application is bound to the dummy interface for one or more specified network ports.

24. The system of claim 23, wherein the remote computing system is a VPN gateway, wherein the VPN gateway is part of a private network subnet, wherein network packets addressed to the dummy interface on the VM instance are routed to the VPN gateway.

25. The system of claim 24, the operation further comprising:
receiving, by the VPN server, from the intranet application, one or more network packets addressed to the network address assigned to the VPN interface on the remote computing system;
forwarding, over the VPN connection, the one or more network packets to a public network address of the remote computing system;

metering use of the VM instance associated with a request; and generating an invoice based on the metered use.

\* \* \* \* \*